United States Patent [19]

Deaver

[11] Patent Number: 4,483,895
[45] Date of Patent: Nov. 20, 1984

[54] ABSORBENT APRON FOR HIGH CHAIRS AND THE LIKE

[76] Inventor: Viola M. Deaver, 1742 Danford St., Naples, Fla. 33942

[21] Appl. No.: 394,895

[22] Filed: Jul. 6, 1982

[51] Int. Cl.³ .............................................. B32B 27/14
[52] U.S. Cl. .................................... 428/198; 428/213; 428/507; 428/913
[58] Field of Search ............... 428/198, 332, 337, 342, 428/298, 302, 303, 507, 913, 213

[56] References Cited

U.S. PATENT DOCUMENTS

| | | | |
|---|---|---|---|
| 2,897,108 | 7/1959 | Harwood | 428/198 |
| 3,342,613 | 9/1967 | Schelhorn | 428/198 |
| 4,066,813 | 1/1978 | Winters et al. | 428/507 |
| 4,219,600 | 8/1980 | Surowitz et al. | 428/198 |
| 4,328,275 | 5/1982 | Vargo | 428/195 |

FOREIGN PATENT DOCUMENTS 979798 12/1975 Canada ................................ 428/198

Primary Examiner—James J. Bell
Attorney, Agent, or Firm—Merrill N. Johnson

[57] ABSTRACT

An absorbent apron for use beneath an infant high chair or the like comprising a liquid impervious sheet and a liquid absorbent non-woven layer of bonded fibrous material firmly joined throughout their interface.

The liquid impervious sheet is preferably a thin flexible film of polyethylene. The fibrous layer is composed of cellulosic or similar fibers of varying length thoroughly bonded together into a highly absorbent layer between 1/16th and ⅛ of an inch in thickness. The impervious sheet and the absorbent layer are joined together throughout their interface by spaced beads or lines of adhesive or by the polyethylene film being extruded directly onto the layer of bonded fibrous material.

The apron is approximately five feet square so that when placed beneath a higher chair, it will receive and retain all of the food and liquids dropped or spilled by the infant in the high chair. Being inexpensive and flexible, the apron can be readily wadded up and disposed of after use.

3 Claims, 3 Drawing Figures

U.S. Patent
Nov. 20, 1984
4,483,895
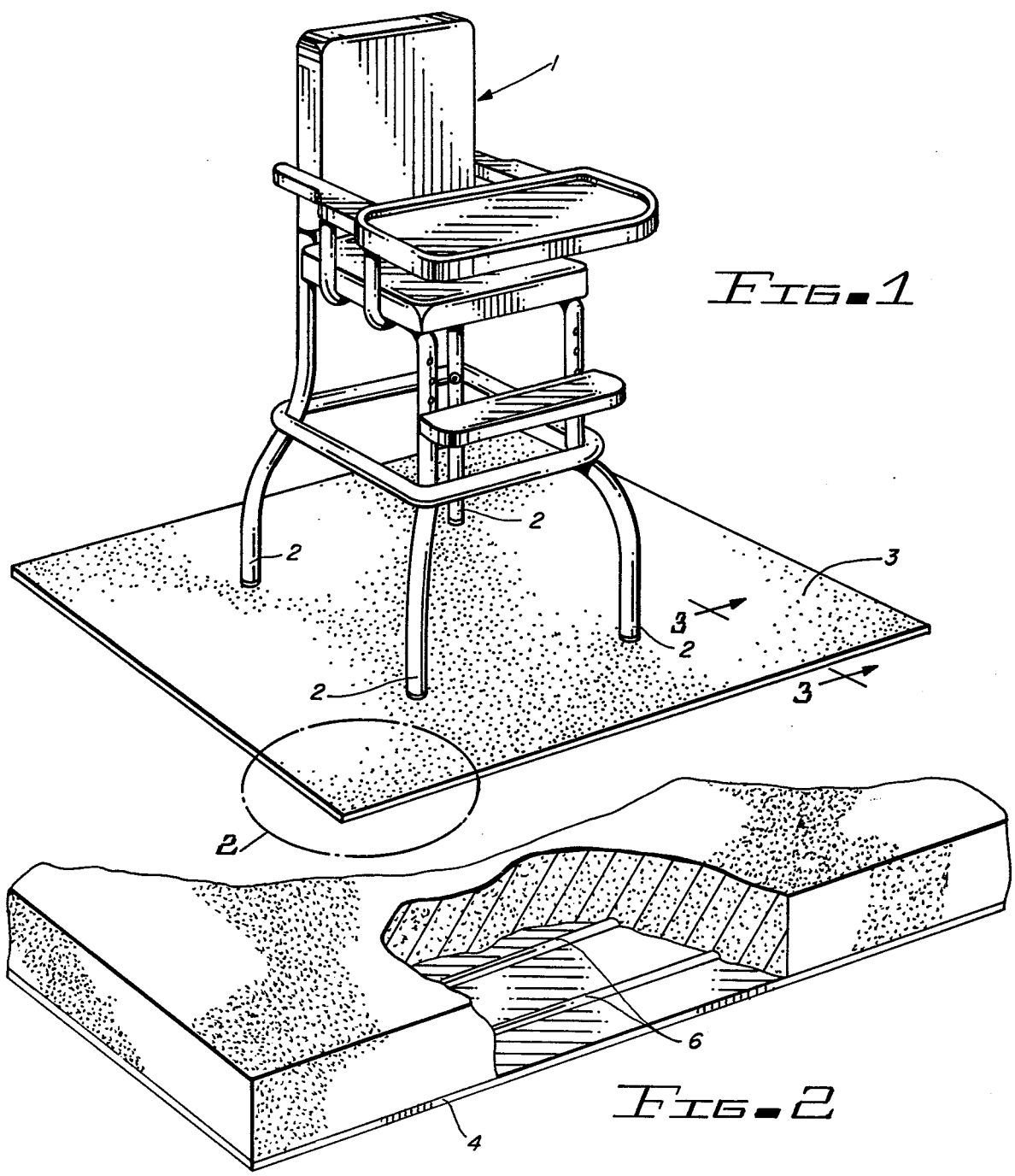
FIG-1
FIG-2
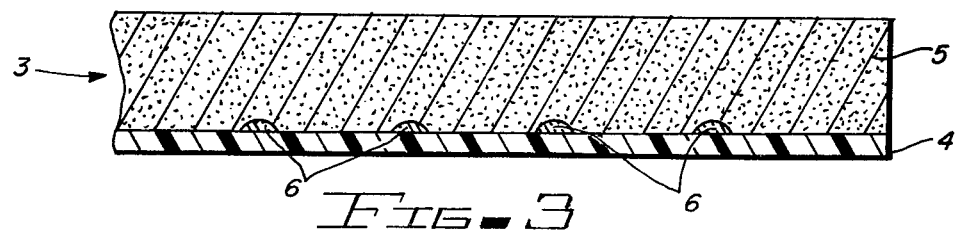
FIG-3

ABSORBENT APRON FOR HIGH CHAIRS AND THE LIKE

BACKGROUND AND SUMMARY OF THE INVENTION

I have invented a unique disposable absorbent apron for use with an infant high chair or the like. Food catching attachments for use with chairs and especially infant high chairs have been suggested for many years but they have met with little success due largely to the expense, awkwardness and unhygienic nature of such devices as shown in U.S. Pat. Nos. 939,841, 2,585,434 and 3,298,736.

Using technology developed for the manufacture of disposable diapers, my absorbent high chair apron can be made so inexpensively that the apron can be readily disposed of after use, thus eliminating the three major defects of existing high chair food catching arrangements, namely, they were expensive, they were awkward to use and store, and they had to be cleaned after each use, which was both time-consuming and unhygienic.

My disposable high chair apron is a thin flexible two ply square measuring five feet or slightly more on each side and less than ¼ inch thick. The apron comprises a liquid impervious lower sheet and an upper layer of liquid absorbent non-woven fibrous material firmly joined to the lower sheet throughout their interface.

The liquid impervious lower sheet is preferably a thin flexible film of polyethylene. The upper layer is made of cellulosic or similar fibers of varying length bonded together into a highly absorbent layer between 1/16th and ⅛th of an inch thick. The impervious sheet and the absorbent layer are joined together by spaced beads or lines of adhesive or alternatively by the polyethylene film being extruded directly onto the layer of fibrous material.

When the apron is at least five feet square and centered beneath a high chair, it will receive and retain all of the foods and liquids, even a cupful of milk, dropped or spilled by an infant in the chair. Both dry and wet foods will be held by the absorbent layer and prevented from soiling the floor or carpet by the lower sheet of polyethylene. After the chair has been removed, the apron is simply wadded up and disposed of without further cleaning.

BRIEF DESCRIPTION OF THE DRAWINGS

FIG. 1 is a perspective view showing my absorbent apron centered beneath an infant high chair;

FIG. 2 is a partial cross sectional view of my absorbent apron; and

FIG. 3 is a vertically enlarged perspective view, with a portion broken away, of my absorbent apron.

DETAILED DESCRIPTION OF THE INVENTION

FIG. 1 of the drawings shows a conventional infant high chair 1 whose four legs 2 are centered upon a two ply apron 3 according to my invention. I have found that when apron 3 is at least five feet on a side or slightly larger that it will retain and absorb all foods and liquids dropped or spilled in the course of feeding the infant in the chair.

FIGS. 2 and 3 show the construction of my inexpensive and disposable apron. FIG. 2 is a partial cross section of apron 3 in which a sheet 4 of polyethylene or similar film is shown joined to a layer of bonded fibrous material 5 by beads or lines 6 of adhesive.

Sheet 4 is preferably a film of polyethylene manufactured by extrusion and as an alternative to the film being joined to the fibrous layer 4 by spaced beads or lines of adhesive as shown in FIGS. 2 and 3, the film may be extruded directly onto the fibrous layer using techniques known in the art. In order to make the apron as inexpensive as possible and thus make it disposable after a single use, the film should be maintained at a thickness of between 0.001 and 0.003 of an inch. Although preferably polyethylene, equivalent plastic material such as polypropylene or polyvinyl chloride may be used.

Layer 5 is composed of cellulosic or similar fibers of varying length thoroughly bonded together into a highly absorbent mat between 1/16th and ⅛th of an inch thick. Although most of the fibers used are for reasons of effectiveness and economy made of cellulose, some of the longer fibers may be rayon fibers of textile length. The techniques for bonding such fibers into a thin highly stable mat having great absorbency is known and described in U.S. Pat. Nos. 3,768,118 and 4,045,833.

FIG. 3 is a perspective view of apron 3 showing lower sheet 4 with upper layer 5 partially broken away to expose the spaced lines 6 of adhesive used to firmly join absorbent layer 5 onto liquid impervious sheet 4 throughout the entire interface between sheet 4 and fibrous layer 5.

The techniques for inexpensively manufacturing films which are both flexible and liquid impervious and non-woven mats of bonded fibers which are highly absorbent, and for joining such films and mats into a two ply web are well known in the manufacture of disposable baby diapers. These techniques can readily be used to produce two ply webs which are five feet or more wide and these webs can be cut into five-foot lengths to inexpensively manufacture five-foot square absorbent aprons for use with high chairs and the like in accordance with my invention.

While I have shown and described the preferred form of my invention, certain changes and modifications will be apparent to those skilled in the art and accordingly my invention is limited only by the scope and spirit of the following claims.

I claim:

1. A disposable absorbent apron for use on the floor beneath a high chair or the like comprising:
    a liquid impervious sheet of extruded plastic film for contact with the floor having a thickness between 0.001th and 0.003ths of an inch, and
    an upper liquid absorbent layer composed of fibers bonded together to form a mat having a thickness between 1/16th and ⅛th of an inch,
    said plastic sheet and fibrous layer being joined together throughout their interface, and
    said apron being square with sides measuring five feet in length, said upper liquid absorbent layer having sufficient bulk, surface area and porosity so that it will absorb and retain spills of liquid and semi-solid food deposited on the apron from the chair and all spilled food will be removed upon disposal of the apron.

2. A disposable absorbent apron according to claim 1 in which the liquid impervious sheet for contact with the floor and the liquid absorbent layer above the liquid impervious sheet are joined together by spaced lines of adhesive.

3. A disposable liquid absorbent apron for use on the floor beneath a chair comprising:
a liquid impervious sheet of extruded plastic film for contact with the floor, said film having a thickness between 0.001th and 0.003ths of an inch, and
an upper liquid absorbent layer composed of fibers of varying lengths bonded together to form a mat having a thickness between 1/16th and ⅛th of an inch,
said lower plastic sheet and said upper fibrous layer being joined together throughout their interface by a series of spaced-apart deposits of adhesive, and
said apron being square with sides each measuring five feet in length,
said upper liquid absorbent layer having sufficient bulk, surface area and porosity so that it will absorb and retain spills of liquid and semi-solid food deposited on the apron from the chair and all spilled food will be removed upon disposal of the apron.

* * * * *